United States Patent
Blair et al.

(10) Patent No.: US 7,929,972 B2
(45) Date of Patent: Apr. 19, 2011

(54) METHOD OF TRANSMITTING DATA, A CONTROLLER AND A WIRELESS COMMUNICATIONS DEVICE

(75) Inventors: John L. Blair, Atlanta, GA (US);
Ming-Ju Ho, Alpharetta, GA (US);
Michael S. Rawles, Acworth, GA (US);
Raymond R. Thomas, Atlanta, GA (US)

(73) Assignee: Agere Systems Inc., Allentown, PA (US)

( * ) Notice: Subject to any disclaimer, the term of this patent is extended or adjusted under 35 U.S.C. 154(b) by 659 days.

(21) Appl. No.: 11/421,334

(22) Filed: May 31, 2006

(65) Prior Publication Data
US 2006/0205423 A1 Sep. 14, 2006

Related U.S. Application Data

(63) Continuation of application No. 09/813,424, filed on Mar. 21, 2001, now Pat. No. 7,079,847.

(51) Int. Cl.
*H04W 72/00* (2009.01)
*H04W 4/00* (2009.01)

(52) U.S. Cl. .................. 455/452.2; 455/450; 455/452.1; 370/328; 370/329; 370/338

(58) Field of Classification Search .................. 455/512, 455/509, 516–517; 370/229–238
See application file for complete search history.

(56) References Cited

U.S. PATENT DOCUMENTS

| | | | |
|---|---|---|---|
| 6,072,994 A * | 6/2000 | Phillips et al. ................. 455/84 |
| 6,253,063 B1 * | 6/2001 | Cudak et al. ................. 455/63.1 |
| 6,442,151 B1 * | 8/2002 | H'mimy et al. ................ 370/333 |
| 6,785,252 B1 * | 8/2004 | Zimmerman et al. ........ 370/337 |
| 6,850,764 B1 * | 2/2005 | Patel ............................ 455/450 |
| 6,975,603 B1 * | 12/2005 | Dicker et al. ................. 370/329 |
| 2002/0115421 A1 * | 8/2002 | Shahar et al. ................ 455/403 |

* cited by examiner

*Primary Examiner* — Kamran Afshar
*Assistant Examiner* — Kathy Wang-Hurst (57) ABSTRACT

The present invention provides a method of transmitting data across a communications network having multiple channels, a controller for use with a transceiver in a wireless communications network and a wireless communications device. In one embodiment, the method of transmitting data includes establishing a bandwidth for transmission of the data based on a priority status thereof, selecting a modulation scheme and symbol rate as a function of the establishing the bandwidth, concluding if at least one channel from the multiple channels provides the bandwidth and transmitting the data over the as least one channel based on the concluding.

17 Claims, 5 Drawing Sheets

METHOD OF TRANSMITTING DATA, A CONTROLLER AND A WIRELESS COMMUNICATIONS DEVICE

CROSS REFERENCE TO RELATED APPLICATION

This application is a continuation of U.S. patent application Ser. No. 09/813,424, entitled "CONTROLLER AND TRANSCEIVER EMPLOYABLE IN A WIRELESS COMMUNICATIONS NETWORK", filed on Mar. 21, 2001 now U.S. Pat. No. 7,079,847, by John L. Blair, et al. The above-listed application is commonly assigned with the present invention and is incorporated herein by reference as if reproduced herein in its entirety.

TECHNICAL FIELD OF THE INVENTION

The present invention is directed, in general, to communications systems and, more specifically, to a controller and transceiver employable in a communications network.

BACKGROUND OF THE INVENTION

Traditionally, local area networks (LANs) include computer systems configured with a number of processing devices and a server coupled together by a hard-wired connection. Recently, however, wireless LANs have become more common in the marketplace. Although the concept behind wireless LANs has been known for decades, interest in wireless LANs was limited until the release of the 2.4 GHz (2.4 GHz-2.4835 GHz) unlicensed radio frequency band for industrial, scientific and medical applications (ISM band).

The United States Federal Communications Commission (FCC) requires that products used in the ISM band employ "spread spectrum" technologies. The two most common spread spectrum technologies are direct sequence spread spectrum (DSSS) and frequency hopping spread spectrum (FHSS) technologies. The DSSS technology presently dominates the ISM band due to the higher throughput, lower latency, better modulation and increased power efficiency offered.

Spread spectrum techniques spread information content over a wider bandwidth than the frequency content of the original information, thus providing a relatively secure form of information transmission. Radio frequency (RF) transceivers employing spread spectrum technologies are well-known in the art and widely used. Although the applications in which spread spectrum transceivers are used are too numerous to describe in detail, increasingly popular applications are in the fields of wireless telephony and wireless computer systems.

A distinguishing feature of spread spectrum technologies such as DSSS is that the modulated output signals occupy a much greater transmission bandwidth than the baseband information bandwidth requires. The spreading is achieved by encoding each data bit in the baseband information using a codeword, or symbol, that has a much higher frequency than the baseband information bit rate. The resultant "spreading" of the signal across a wider frequency bandwidth results in comparatively lower power spectral density, so that other communication systems are less likely to suffer interference from the device that transmits the spread spectrum signal. It also makes the spread signal harder to detect and less susceptible to interference (i.e., harder to jam).

Although the DSSS technology brings these benefits to a wireless LAN, another key performance parameter of any communication network, particularly computer networks and cellular telephone systems, is the available transfer rate of data between devices in the communication network. Wireless LANs are no exception. It is therefore important to maximize the rate at which data may be exchanged between transmitters and receivers in a wireless LAN in order to maximize overall LAN performance.

At present, perhaps the most popular application in the ISM frequency band is the Institute of Electrical and Electronics Engineers (IEEE) 802.11 standard, which is compatible with the DSSS technology in a wireless LAN. IEEE 802.11 is a set of specifications intended to create a standard for wireless local area networking technology. These rules have been under development for several years and have evolved into a rather broad set of specifications for both direct sequence and frequency hopping spread spectrum systems. The current frequency bandwidth of the 802.11 DSSS wireless LAN in the ISM band is fixed at 22 MHZ and supports only four data transfer rates: 1) binary phase shift keying (BPSK) at 1 Mbps with 1 bit per symbol; 2) quadrature phase shift keying (QPSK) at 2 Mbps with 2 bits per symbol; 3) complementary code keying (CCK) at 5.5 Mbps with 4 bits per symbol; and 4) complementary code keying (CCK) at 11 Mbps with 8 bits per symbol. Those skilled in the art understand the limitations involved when only a few transfer rates are available in a band having ever-growing popularity.

Limited to only four data rates, one of the foreseeable problems facing the 802.11 wireless LAN in the ISM band is an increase in interference. An 802.11 DSSS system found in the ISM band typically withstands interference so long as the instantaneous bandwidth of that interference is limited. More specifically, the process gain provided in DSSS wireless LAN systems (FCC Part 15.247 requires a process gain of at least 10 database) by spreading their signals over the 22 MHZ bandwidth of the ISM band allows them to tolerate narrow band interference even if that interference is nearby. However, if interference grows to cover a significant portion of the 22 MHZ bandwidth, or if the strength of the interference signal is extremely intense, then the performance degradation caused by the interference will become significant.

Currently, the free and unlicensed 2.4 GHz ISM band is very appealing to companies in the wireless field and has experienced rapid growth in the number of products used in the band. As a result, excessive mutual interference is inevitable. For example, many 2.4 GHz cordless telephones occupy significant bandwidth (up to several MHZ in bandwidth) which may impact the performance of the 802.11 wireless LAN.

Another foreseeable problem facing the 802.11 wireless LAN is compatibility with adjacent frequency bands, such as the multi-channel multi-port distribution service (MMDS) band. As only one example, the MMDS band (2.5 GHz-2.686 GHz) is a licensed band whose more regulated use may become overwhelmingly attractive to wireless companies tired of facing congestion problems in the unlicensed ISM band. A fixed bandwidth of 6 MHZ in the MMDS band, much smaller than the fixed 22 MHZ of the ISM band, may also present compatibility problems for 802.11 applications set for only 22 MHZ operation.

Yet another problem is the currently limited data rates (presently only the four data rates listed above) of the ISM frequency band. The fixed 22 MHZ bandwidth in the ISM band limits the number of available channels that may be used by an 802.11 DSSS system in a single area. Moreover, the limited data transmission rates may not be utilizing the precious bandwidth efficiently by occupying large amounts of bandwidth when not necessary.

Still a further problem facing the 802.11 wireless LAN is the interest shown by Internet Service Providers (ISPs) to provision the ISM band for broadband data service. Since the IEEE 802.11 DSSS wireless LAN is the most popular application in the ISM band, the 802.11 system must cooperate with provisioning schemes if the ISPs choose to incorporate the ISM band, or any other band in which the 802.11 wireless LAN may operate, into future broadband data service.

Accordingly, what is needed in the art is a controller for wireless communications networks (including those incorporating spread spectrum systems) that take into account the aforementioned challenges and overcome the deficiencies in the prior art.

SUMMARY OF THE INVENTION

To address the above-discussed deficiencies of the prior art, the present invention provides a method of transmitting data across a communications network having multiple channels. In one embodiment, the method of transmitting data includes establishing a bandwidth for transmission of the data based on a priority status thereof, selecting a modulation scheme and symbol rate as a function of the establishing the bandwidth, concluding if at least one channel from the multiple channels provides the bandwidth and transmitting the data over the as least one channel based on the concluding.

The present invention provides in another aspect a controller for use with a transceiver that transmits and receives data in a wireless communications network having multiple channels. In one embodiment, the controller includes a selection system configured to select at least one channel of the multiple channels having an intended bandwidth for transmission of the data at a data rate and, if the intended bandwidth is not available, select a reduced data rate for transmission of the data when the data is priority data.

In yet another aspect, the present invention provides a wireless communications device for use in a wireless communications network having multiple channels. In one embodiment, the wireless communications device includes an antenna and a transceiver that transmits and receives wireless signals, the transceiver having a controller configured to establish a bandwidth for transmission of data via the antenna based on a priority status thereof, select a modulation scheme and symbol rate as a function of the bandwidth and determine if at least one channel from the multiple channels provides the bandwidth.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
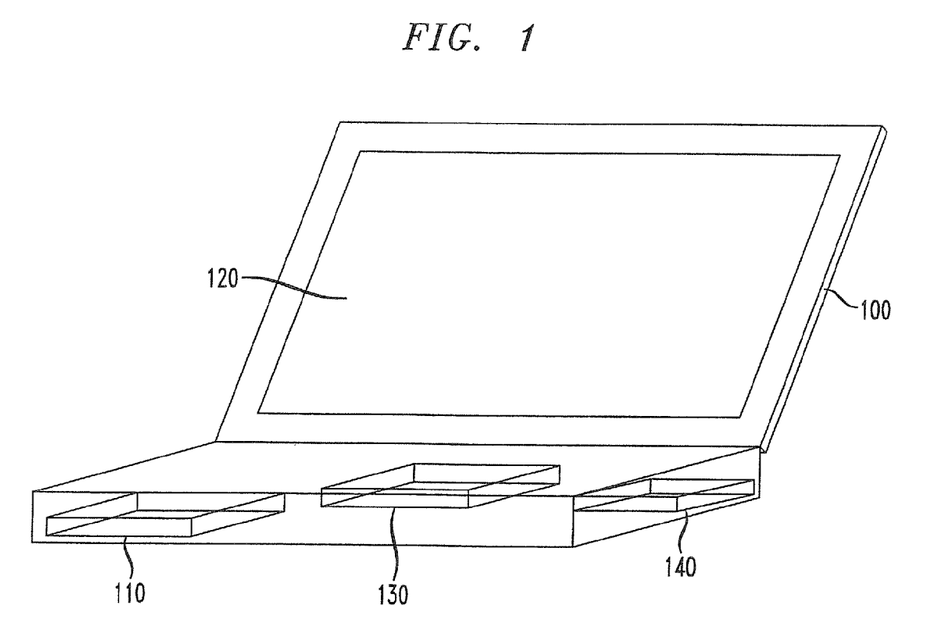
FIG. 1 illustrates a perspective drawing of one embodiment of a wireless communication device that may provide an environment for a transceiver constructed according to the principles of the present invention.

Referring initially to FIG. 1, illustrated is a perspective drawing of one embodiment of a wireless communications device 100 that may provide an environment for a transceiver constructed according to the principles of the present invention. The wireless communications device 100 illustrated is a notebook computer, however other devices capable of wireless communication are also within the broad scope of the present invention. Several wireless communications devices, whether embodied in a notebook computer or other device, may be configured to exchange data using existing bands of radio wave frequencies (RF band) to form a wireless local area network (LAN) for use with the present invention.

The device 100 includes a data storage device 110, which may be a floppy or hard disk drive. Information received or transmitted over a wireless LAN may be stored in, or retrieved from, the data storage device 110. The device 100 further includes a display area 120. The display area 120 may be used to display such information, or even to compose that information before being transmitted over the wireless LAN. The device 100 also includes a central processing unit (CPU) 130. The CPU 130 is used to execute the commands of a user employing the device 100. Among the commands that may be executed is the transmission or reception of data across the wireless LAN.

The device 100 still further includes a data transmission device 140. The data transmission device 140 may be embodied in a modem, however the data transmission device 140 may be any device capable of receiving or transmitting data across a wireless LAN. To use the data transmission device 140 to transmit across such a LAN, a user may command the CPU 130 to access data from the data storage device 110, and optionally display that data in the display area 120 before it is transmitted. The data is then sent to the data transmission device 140, which transmits the data across the wireless LAN using one of the available channels in the selected RF band. As discussed above, if the selected band is the ISM band, spread spectrum technology is preferable for the transmission and reception of data. In a preferred embodiment of the present invention, the data transmission device 140 conforms to the IEEE 802.11 application regulations. Of course, it should be understood that the improved spread spectrum technology described herein may readily be employed in wireless computer networks conforming to other standards, and even to communication systems other than computer networks, such as cellular telephone systems and the like.

Figure 2:
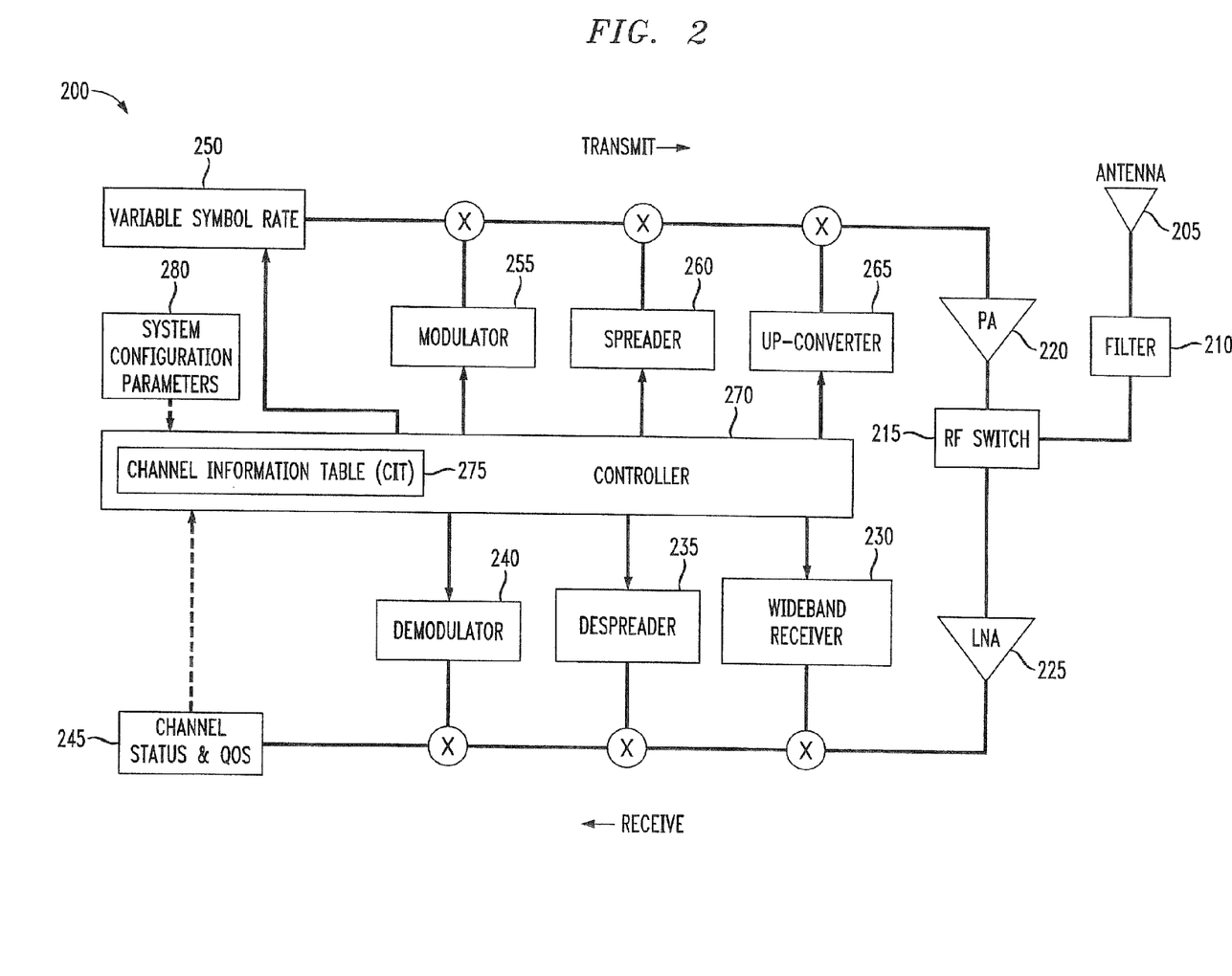
FIG. 2 illustrates a high level block diagram of one embodiment of a transceiver constructed according to the principles of the present invention.

Turning now to FIG. 2, illustrated is a high level block diagram of one embodiment of a transceiver 200 constructed according to the principles of the present invention. The transceiver 200 is operable with several conventional components such as an antenna 205, a filter 210 and an RF switch 215.

Those skilled in the art are familiar with the use of these components, and thus will not be described herein.

Along a receive path, the transceiver 200 includes a low noise amplifier (LNA) 225 to amplify a received data transmission made across a wireless communications network, such as a wireless LAN. Also found along the receive path is a wideband receiver 230. The wideband receiver 230 periodically scans and digitizes the entire frequency band on which the signal is received (for example, the ISM or MMDS band) for each channel within that band. The incoming signal next passes through a despreader 235. The despreader 235 transforms the spread spectrum signal, which has been expanded to a bandwidth greater than its original bandwidth for transmission using spread spectrum technology, back to its original bandwidth. The signal then passes through a conventional demodulator 240, which converts the signal from its incoming analog format to a digital format readable by the wireless communications device incorporating the transceiver 200. Again, the wireless communications device may be a notebook computer, such as the device 100 illustrated in FIG. 1, however the present invention is not so limited.

While passing through the various components on the receive path, specific signal information 245 pertaining to the incoming signal, as well as the channel on which it has been transmitted, is collected, in accordance with the present invention. In one embodiment, the signal information 245 includes the quality of service (QOS) of the received signal, as well as the channel status of the channel used. More specifically, in an exemplary embodiment of the present invention the QOS of the incoming signal refers to the signal strength and clarity of the signal. In other embodiments, the QOS may refer to the bit-error rate or packet-error rate of the transmission. The channel status refers to the presence of any interference on the available transmission channels in the frequency band. Of course, other information may be gathered to compose the signal information 245.

Once compiled, the signal information 245 is input into a channel information table (CIT) 275 located within a transceiver controller 270 constructed according to the principles of the present invention. The CIT 275 uses the signal information 245, along with system configuration parameters 280 established by the user based on the type of data, to compile a list of desirable and undesirable broadcast channels available to the controller 270. As used herein, the term "desirable channel" includes those channels having a degree of interference from other signals, whether spread spectrum or not, such that a data transmission may be made without significant, negative impact on the fidelity of the data. With this list, the controller 270 may then adaptively configure the bandwidth of spread spectrum data transmissions received by and transmitted from the transceiver 200 based on available desirable channels. In addition to bandwidth, desirable channels are also selected based on, for instance, symbol rate, data rate, and modulation scheme, as will be described in greater detail below.

Once one of the available desirable channels is selected, based on the aforementioned information, the controller 270 configures the transceiver 200 to transmit and receive on this channel until the status of that channel, or the QOS of a signal carried on that channel, falls below a respective threshold. To accomplish this, in one embodiment the controller 270 may be configured to periodically determine the channel status and QOS of the signal. In an alternative embodiment, this signal information 245 may be determined with each incoming signal. The process of adaptively configuring radio signals according to the present invention will be described in greater detail with reference to FIGS. 3, 4 and 5.

When a signal is passing through the transmit path, several components and parameters are used. Specifically, based on the system configuration parameters 280, the data to be transmitted employs a data rate, a symbol rate, and a modulation scheme. In one embodiment, the frequency band used to transmit data is the ISM band. Those skilled in the art understand that IEEE 802.11 direct sequence spread spectrum technology provides a maximum of four data transmission rates within the fixed frequency bandwidth of 22 MHZ of the ISM band. By adaptively configuring the spread spectrum data transmission according to the present invention, data rates and occupied bandwidth for a given modulation scheme may be expanded or reduced. The available data rates and occupied bandwidth for a transceiver incorporating the principles of the present invention and functioning in the popular ISM band are illustrated in Table 1:

TABLE 1

| Modulation | Symbol rate | | | |
| --- | --- | --- | --- | --- |
| | ¼ Mbaud | ½ Mbaud | ¾ Mbaud | 1 Mbaud |
| BPSK | 5.5 MHZ | 11 MHZ | 16.5 MHZ | 22 MHZ |
| | 0.25 Mbps | 0.5 Mbps | 0.75 Mbps | 1.0 Mbps |
| QPSK | 5.5 MHZ | 11 MHZ | 16.5 MHZ | 22 MHZ |
| | 0.5 Mbps | 1.0 Mbps | 1.5 Mbps | 2.0 Mbps |
| CCK (4bits/symbol) | 5.5 MHZ | 11 MHZ | 16.5 MHZ | 22 MHZ |
| | 1.375 Mbps | 2.75 Mbps | 4.125 Mbps | 5.5 Mbps |
| CCK (8bits/symbol) | 5.5 MHZ | 11 MHZ | 16.5 MHZ | 22 MHZ |
| | 2.75 Mbps | 5.5 Mbps | 8.25 Mbps | 11.0 Mbps |

In addition, the data will either be denoted as priority or non-priority data. These parameters, perhaps as well as others, are used with the signal information 245 to compose the channel information in the CIT 275. As a result, the CIT 275, which in turn is used by the controller 270 to determine which channel and bandwidth to use, is compiled at least partially from the type of data to be transmitted. In a preferred embodiment, the controller 270 maintains a separate CIT 275 for each channel being monitored. Those skilled in the art are familiar with the various data rates and symbol rates available on existing RF bands, as well as which rates are preferably used for certain types of data.

Once a desirable channel is selected for the type of data to be sent, in accordance with the principles discussed above, the controller 270 sends the data to a modulator 255 to be converted from digital information into an analog signal. The signal then passes through a spreader 260 to be converted to a larger bandwidth in accordance with conventional spread spectrum technology. In a preferred embodiment, the spread spectrum technology used by the controller 270 of the present invention is direct sequencing spread spectrum (DSSS), due to its confinement to channels within a given frequency bandwidth (for example, 22 MHZ in the ISM band) rather than "hopping" from channel to channel within the overall RF band. Since a transceiver 200 according to the present invention determines which channel is more desirable for the transmission of data, the single channel technique of the DSSS lends itself more readily to the principles of the present invention. However, in alternative embodiments, the controller 270 may be configured to select desirable channels within different frequency bandwidth for use with other techniques such as frequency hopping spread spectrum (FHSS) technology.

After the signal has been spread using conventional techniques, an up-converter 265 selects a carrier frequency within the selected channel to carry the signal to its destination. The carrier frequency carrying the data signal is then amplified by a power amplifier 220, passed through the RF switch 215 and the filter 210, and then transmitted to the wireless LAN via the antenna 205. Another wireless communications device in the wireless LAN having a transceiver constructed according to the present invention may then receive the transmitted signal along a receive path of its own. The transceiver 200 of FIG. 2 and any other transceivers constructed according to the present invention may then cooperate to exchange data through channels having an acceptable degree of distortion and interference by adaptively configuring the bandwidth and channel used for those transmissions.

Figure 3:
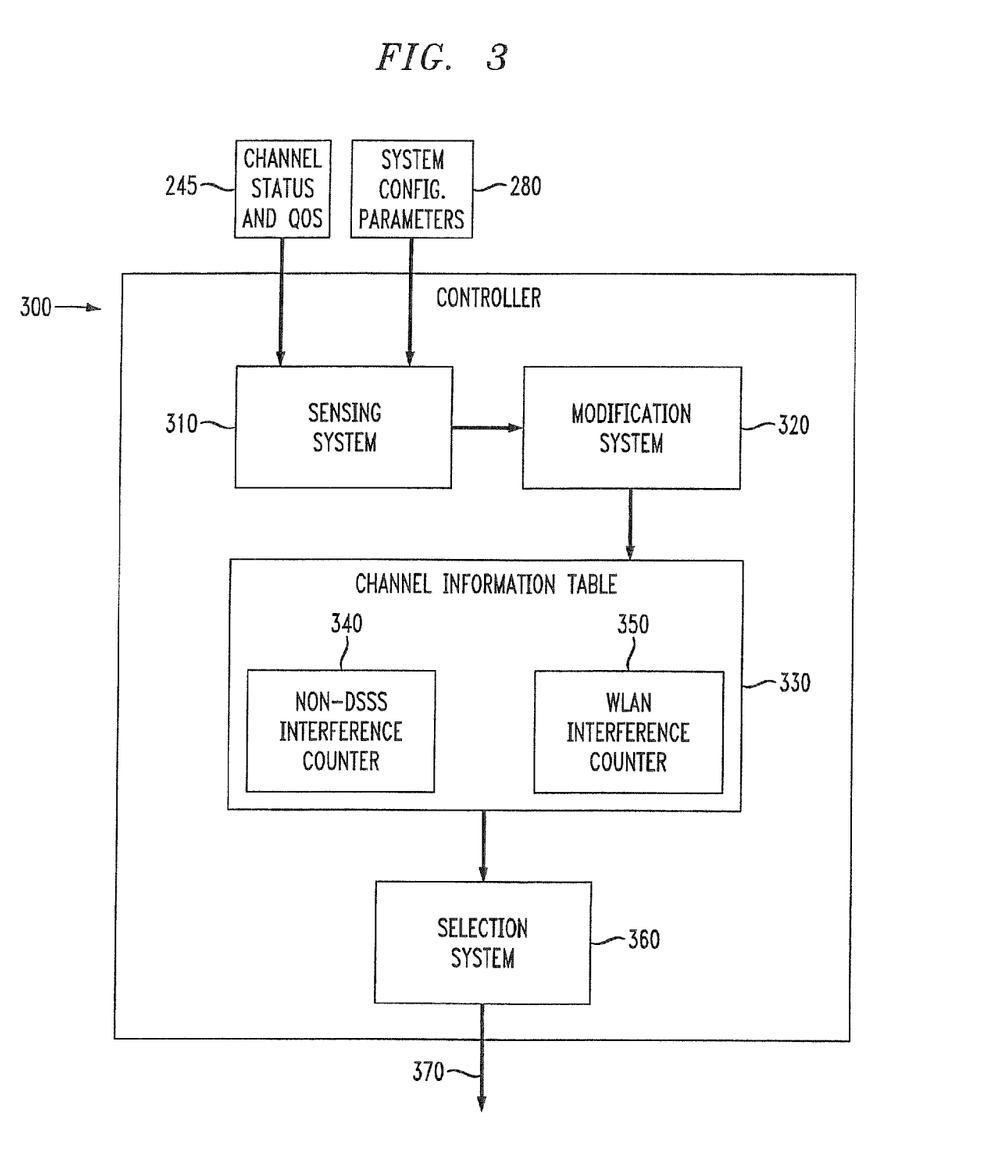
FIG. 3 illustrates a high level block diagram of one embodiment of a controller constructed according to the principles of the present invention.

Now looking at FIG. 3, illustrated is a high level block diagram of one embodiment of a controller 300 constructed according to the principles of the present invention. As illustrated, the controller 300 includes a sensing system 310, a modification system 320, a channel information table 330, and a selection system 360.

The sensing system 310 receives signal information such as the signal information 245 (channel status and QOS) discussed with respect to FIG. 2. In addition, the sensing system 310 also receives system configuration parameters provided by the user and based on the type of data to be transmitted such as the system configuration parameters 280 also illustrated in FIG. 2. As before, the sensed information is not limited to the signal information and system configuration parameters, but rather may include other information beneficial in determining the appropriate channel and bandwidth for the given data rate of a DSSS data transmission. After sensing all the desired information, the sensing system 310 transfers the information to the modification system 320.

Once in the modification system 320, the signal information is compiled in light of the system configuration parameters, as well as any other pertinent information. The modification system 320 then posts the compiled channel information in the channel information table (CIT) 330. In a preferred embodiment, the controller 300 includes a separate CIT 330, each including a non-DSSS interference counter 340 and a WLAN interference counter 350, for each channel monitored by the controller 300. Alternatively, the controller 300 may have only one CIT 330 housing a set of counters 340, 350 for each monitored channel. The counters 340, 350 may have values added or subtracted to them as a result of the signal information and the system configuration parameters. For example, either or both of the counters 340, 350 may have a 0 or 1, however the present invention may also include other values. The effect of the values in either or both counters 340, 350 will be described in greater detail with reference to FIG. 4.

Once values are posted in the counters 340, 350 of the CIT 330, available desirable channels for data transmission based on the provided information and parameters are known. After the channel information is posted in the CIT 330, the selection system 360 then selects appropriate available and desirable channels for the transmission. Once selected, the selection system 360 allows the controller 300 to command, via an output 370, the components outside the controller 300 to transmit the data, via, for instance, a DSSS signal, with an appropriate bandwidth, symbol rate and modulation scheme.

In a preferred embodiment of the present invention, the sensing system 310, the modification system 320, the CIT 330, and the selection system 360 are embodied in software routines coded to execute the functions described above. Of course, the components of the controller 300 may alternatively be embodied in hardware devices rather than software routines, however the present invention is not limited to either embodiment.

Figure 4:
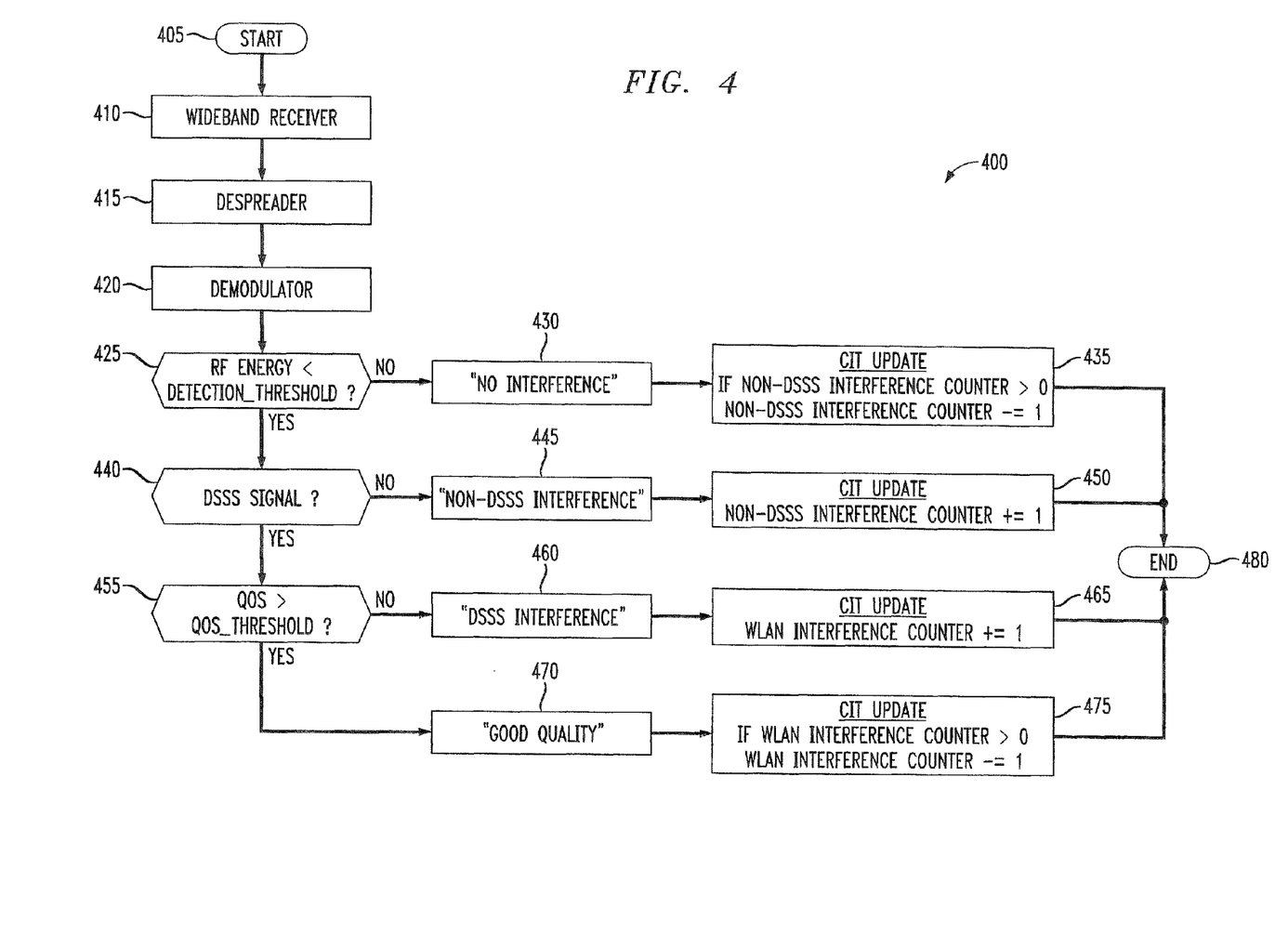
FIG. 4 illustrates a flow diagram of one embodiment of a reception of a data signal made by a transceiver having the controller of FIG. 3.

Turning to FIG. 4, illustrated is a flow diagram 400 of one embodiment of a reception of a data signal made by a transceiver having the controller 300 of FIG. 3. As such, for clarity, the process illustrated in FIG. 4 is described with continued reference to FIG. 3. The reception begins at a start step 405.

At a step 410, a wideband receiver digitizes the entire frequency band (for example, the ISM band) through which the data signal has been sent. As discussed above, this digitizing may be periodically or in response to a received signal. A despreader "despreads" the spread spectrum signal at a step 415, then a demodulator converts the incoming analog signal into digital data for use by a wireless communications device at a step 420.

At a step 425, the RF energy of the incoming signal is compared with a predetermined detection threshold. Specifically, the signal strength, or other parameter(s), is measured to determine if any other device may be impacting the channel which the incoming signal is using. For example, another device or signal may be interfering or trying to "share" the channel with the incoming signal. If the RF energy of the incoming signal is greater than the predetermined threshold, no interference on the channel is detected at a step 430. In the exemplary embodiment of FIG. 3, at a step 435, if the non-DSSS interference counter 340 within the controller 300 is already greater than 0, the counter 340 would then have 1 subtracted from it. The subtraction of a unit would indicate to the controller 300 (and to the user) that the current incoming channel is desirable for continued use due to the lack of interference, DSSS or otherwise, denoted at the step 430. If the non-DSSS counter 340 were already set at 0, then the current channel for the incoming signal is already noted as being a desirable channel for further transmissions. After updating the non-DSSS interference counter 340 as necessary, the process would then move to an end step 480.

However, if at step 425 the RF energy of the incoming signal is less than the predetermined threshold, the process moves to a step 440 where it is determined whether the lack of RF energy in the incoming signal is due to interference (or sharing) from an extraneous DSSS signal. If the extraneous signal is not a DSSS signal, then the process moves to a step 445 where the interference with the incoming signal is denoted as "non-DSSS interference." Then, at a step 450, the CIT 330 is updated by increasing the non-DSSS interference counter 340 for the current channel by 1. This channel would now be marked as less desirable than other available channels having a 0 in their respective non-DSSS interference counter 340. The process would then move to the end step 480.

If at step 440 the extraneous signal is found to be a DSSS signal, the process moves to a step 455 where it is determined whether the QOS of the incoming signal is above a predetermined QOS threshold. If the QOS of the incoming signal is not greater than the QOS threshold, meaning the QOS of the signal is below a minimum requirement, the channel is noted as having "DSSS interference" at a step 460. Then, at a step 465 the CIT 330 is updated by increasing the WLAN interference counter 350 by 1, making it less desirable than other available channels having a 0 in their respective WLAN interference counter. The process would then move to the end step 480. If the QOS of the incoming signal is found to be greater than the QOS threshold, then the process moves to a step 470 where the current channel is noted as having "good quality" for the type and rate of data transmission of the incoming signal. Then, at a step 475 the WLAN interference counter 350 of the channel has 1 subtracted from it, if it does not already equal zero. The process then moves to the end step 480.

Figure 5:
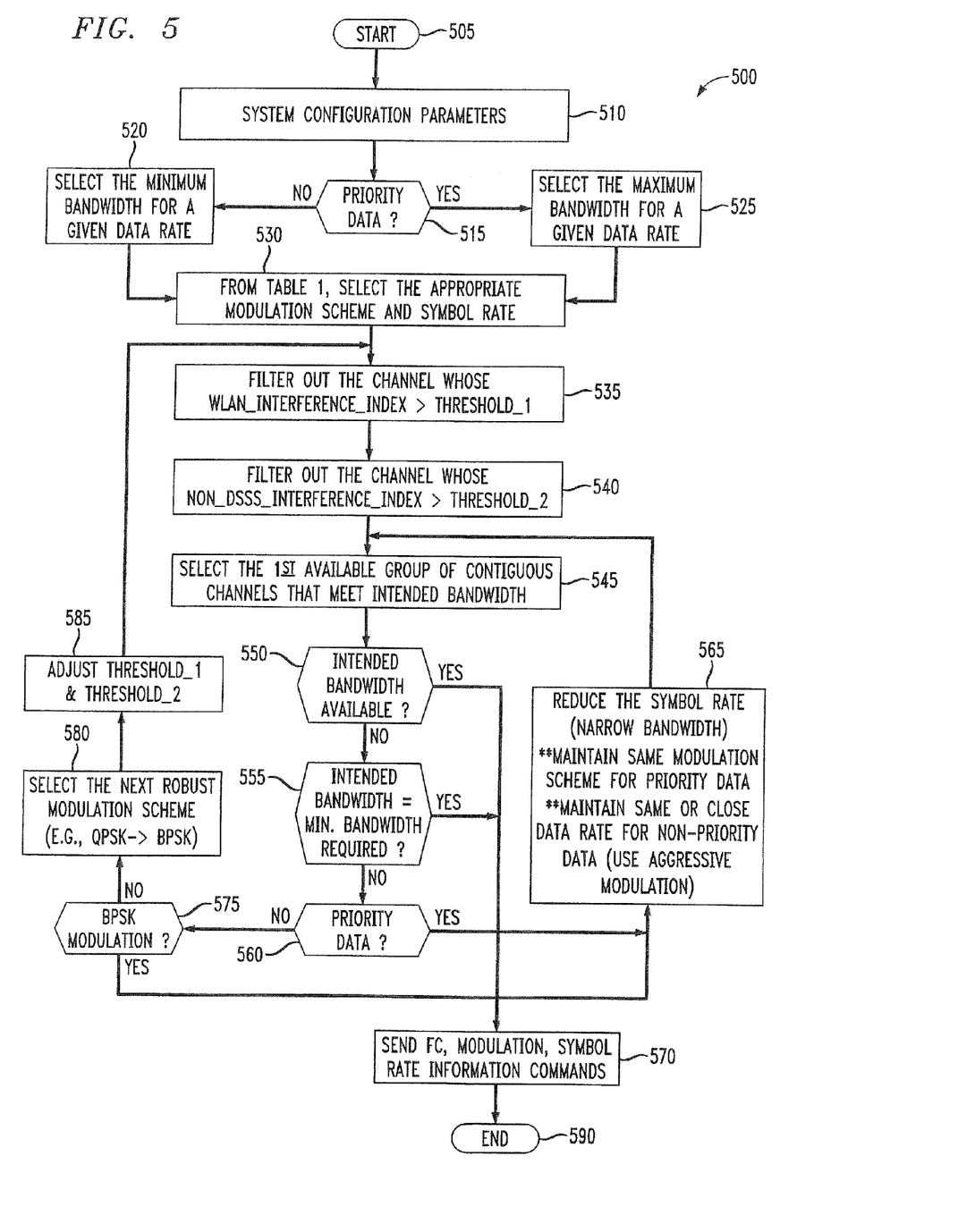
FIG. 5 illustrates a flow diagram of one embodiment of a transmission of a data signal sent by a transceiver having the controller of FIG. 3.

Turning finally to FIG. 5, illustrated is a flow diagram 500 of one embodiment of a transmission of a data signal sent by a transceiver having the controller 300 of FIG. 3. As with the process described in FIG. 4, this process is also described with continued reference to the controller 300 of FIG. 3. In this embodiment, the transmission process begins at a start step 505.

At a step 510, system configuration parameters established by the user for the data transmission to be made are considered. Those skilled in the art understand that only certain modulation schemes, data rates and symbol rates may be used for a given set of parameters. As a result, the channels selected for transmission of the data should not only be found to be desirable, but also available for the rate or modulation scheme preferable for the outgoing data.

At a step 515, it is determined whether the outgoing data is priority or non-priority data. If the data is found to be non-priority, the process moves to a step 520 where the minimum bandwidth or the bandwidth specified by the user for non-priority data is established. However, if the data is found to be priority, the process moves to a step 525 where the maximum bandwidth or the bandwidth specified by the user for priority data is established so as to better ensure a complete transmission of the data. At a step 530, the appropriate modulation scheme and symbol rate is selected for the outgoing data. In addition, depending on the result at step 515, the appropriate bandwidth for the transmission is also selected. Table 1 above illustrates the available combinations of symbol rate and modulation scheme for a given bandwidth.

At a step 535, the selection system 360 within the controller 300 of FIG. 3 filters out the channels whose WLAN interference counter 350 exceeds a predetermined first threshold ("threshold_1"). For example, the first threshold may be established such that the selection system 360 filters out all channels having a WLAN interference counter with a value of 1 or greater. These channels would then be seen by the selection system 360 as undesirable, and would thus leave a fewer number of channels from which to choose (e.g., desirable channels). Next, at a step 540, the selection system 360 filters out the channels whose non-DSSS interference counter 340 exceeds a predetermined second threshold ("threshold_2"). Like the first threshold, the second threshold may be established such that the selection system 360 sees as undesirable the channels having a non-DSSS interference counter with a value of 1 or greater. These undesirable channels would be filtered out from the total desirable channels found at step 535, thus resulting in even fewer desirable channels from which the selection system 360 will choose.

Moving on to step 545, the selection system 360 would then select from the remaining desirable channels, a channel or group of contiguous channels (e.g., 5.5 MHz each) that meets the intended bandwidth for the data transmission. For example, if the intended bandwidth is 22 MHz, 4 contiguous channels would be required for the data transmission. At a step 550, it is determined whether the channel or group of contiguous channels selected in the step 545 are available for use. If the channels are found to be available, the process moves to a step 570 where the controller 300 sends the commands for the carrier frequency, modulation scheme and symbol rate to the appropriate components of the transceiver housing the controller 300 so that the data may be transmitted using those channels. The process would then move to an end step 590.

However, if at step 550 the intended bandwidth is found to be unavailable, the process moves to a step 555. There it is determined whether the intended bandwidth equals the minimum required bandwidth. For the example above, the 22 MHz would not equal the 5.5 MHz required bandwidth. If it is found to be, the process passes to step 570 where the controller 300 sends the commands for the carrier frequency, modulation scheme and symbol rate to the appropriate components of the transceiver housing the controller 300. Then the process would end at the end step 590.

If the intended bandwidth is not found to equal the minimum required bandwidth, then it is again determined whether the data is priority data at a step 560. If the data is found to be priority data, the process moves to a step 565 where the symbol rate initially established for the data transmission is reduced. This, in turn, narrows the bandwidth so that the controller 300 will be more likely to find available channels to transmit the priority data. However, because the data is priority data, the modulation scheme is left unaltered so as not to compromise the data merely for want of a channel. After reducing the symbol rate, the process returns to the step 545 to again select appropriate channels from the list of remaining desirable channels.

If the data is found not to be priority data at the step 560, the process moves to a step 575 where it is determined if a BPSK modulation scheme was originally selected for the non-priority data sought to be transmitted. If the originally chosen modulation scheme is found to be BPSK, the process moves to step 565 where the symbol rate is reduced in order to obtain narrower bandwidth. However, since the data is non-priority, the data rate is maintained while a more aggressive but less robust modulation scheme is implemented in order to find available channels, since fidelity of the data is not as critical as it would be for priority data.

If the originally chosen modulation scheme is not found to be BPSK at the step 575, the process moves to step 580 where the next greater, or more "robust," modulation scheme is selected for the given data transmission. In addition, at step 585 the first and second thresholds used in the steps 535 and 540, respectively, are also adjusted to allow more channels to be viewed as desirable by the selection system 360. As would be expected, this lowering of standards so as to more easily effect the transmission is used for non-priority data since fidelity of the data is not as critical. The process then returns to the step 535 to begin the selection process again, this time with the lowered standards.

While different methods of selecting desirable broadcast channels for a data transmission have been described with reference to FIGS. 4 and 5, each with their own particular benefits, the present invention is not limited to any single method and is broad enough to encompass any equivalent method of channel selection. Moreover, other embodiments of the method of channel selection of the present invention may have additional or fewer steps than described above.

By providing a controller that adaptively configures the channels (bandwidth) of spread spectrum data transmissions received by and transmitted from a transceiver based on available desirable channels, the present invention provides several benefits over the prior art. For instance, the present invention provides for a wider selection of data rates to transmit using spread spectrum technology than previously found in the art. Those skilled in the art understand that a wider selection of data rates allows for a more efficient use and provision of the frequency band by Internet Service Providers and the like. In addition, this wider selection of data rates is available while still relieving congestion, and consequently interference, across both the frequency bandwidth, as well as the entire RF band by adaptively allocating channels and corresponding bandwidth. Moreover, the adaptive channel allocation of the present invention is employable in almost any frequency band, including but not limited to the ISM band and the MMDS band, while retaining benefits such as those described above.

Although the present invention has been described in detail, those skilled in the art should understand that they can make various changes, substitutions and alterations herein without departing from the spirit and scope of the invention in its broadest form.

What is claimed is:

1. A method of transmitting data across a communications network having multiple channels, comprising:
selecting a maximum or a minimum bandwidth for establishing a bandwidth for transmission of said data based on a priority status of said data, wherein a maximum bandwidth is selected for a given data rate if said data is priority data and a minimum bandwidth is selected for a given data rate if said data is not priority data;
selecting a modulation scheme and symbol rate from available combinations of data rates and modulation schemes for said bandwidth, wherein said selecting is a function of said establishing said bandwidth;
concluding if at least one channel from said multiple channels provides said bandwidth;
if said bandwidth is not available for transmission, determining if said bandwidth is a minimum required bandwidth for transmitting said data;
transmitting said data over said at least one channel when concluding said bandwidth is available or after said determining said bandwidth is said minimum required bandwidth; and
if said bandwidth is not said minimum required bandwidth, modifying said symbol rate when said data is priority data, and when said data is not priority data and said modulation scheme is not BPSK, modifying said modulation scheme.

2. The method as recited in claim 1 wherein said modulation scheme and symbol rate are selected from a table.

3. The method as recited in claim 1 further comprising comparing an interference associated with said multiple channels to a threshold.

4. The method as recited in claim 3 further comprising filtering out ones of said multiple channels experiencing interference above said threshold.

5. The method as recited in claim 3 wherein said threshold is a function of said establishing said bandwidth.

6. The method as recited in claim 1 further comprising transmitting said data over said at least one channel using said modulation scheme and symbol rate channel when concluding said bandwidth is available.

7. The method as recited in claim 1 wherein said at least one channel is multiple contiguous channels of said multiple channels and transmitting comprises transmitting said data over said multiple contiguous channels.

8. The method as recited in claim 1 wherein said communications network is a wireless local area network.

9. The method as recited in claim 1 wherein said data is transmitted employing a spread spectrum technology.

10. The method as recited in claim 9 wherein said spread spectrum technology is direct sequencing spread spectrum.

11. The method as recited in claim 9 wherein said spread spectrum technology is frequency hopping spread spectrum.

12. A controller for use with a transceiver that transmits and receives data in a wireless communications network having multiple channels, comprising:
a selection system configured to select at least one channel of said multiple channels having an intended bandwidth for transmission of said data at a data rate and, if said intended bandwidth is not available, select a reduced data rate for transmission of said data when said data is priority data, said selection system further configured to maintain same or about same said data rate when: (1) said intended bandwidth is not available, (2) said data is not priority data, and (3) said modulation scheme is BPSK.

13. The controller as recited in claim 12 wherein said selection system is configured to select a more robust modulation scheme if available for transmission of said data if said intended bandwidth is not available, said data is not priority data and said modulation scheme is not BPSK.

14. The controller as recited in claim 12 wherein said selection system is further configured to select a modulation scheme for said transmission of said data and maintain said modulation scheme when said data is priority data.

15. The controller as recited in claim 12 wherein said selection system is configured to select multiple contiguous channels of said multiple channels.

16. A wireless communications device for use in a wireless communications network having multiple channels, comprising:
an antenna; and
a transceiver that transmits and receives wireless signals, said transceiver having a controller configured to select a maximum or a minimum bandwidth to establish a bandwidth for transmission of data via said antenna based on a priority status of said data, select as a function of said bandwidth, a modulation scheme and symbol rate from available combinations of data rates and modulation schemes for said bandwidth, and determine if at least one channel from said multiple channels provides said bandwidth, said controller further configured to determine if said bandwidth is a minimum bandwidth if said bandwidth is not available for transmission and, if said bandwidth is not a minimum bandwidth, said controller configured to modify said symbol rate when said data is priority data and said controller configured to modify said modulation scheme when said data is not priority data and said modulation scheme is not BPSK.

17. The device as recited in claim 16 wherein said controller is further configured to select a less robust modulation scheme when said modulation scheme is BPSK, said bandwidth is not said minimum bandwidth and said data is not priority data.

* * * * *